(12) United States Patent
Coronado et al.

(10) Patent No.: US 9,317,203 B2
(45) Date of Patent: Apr. 19, 2016

(54) DISTRIBUTED HIGH PERFORMANCE POOL

(71) Applicant: International Business Machines Corporation, Armonk, NY (US)

(72) Inventors: Juan A. Coronado, Tucson, AZ (US); Lisa R. Martinez, Escondido, CA (US); Jennifer S. Shioya, Vail, AZ (US); Todd M. Tosseth, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 13/922,931

(22) Filed: Jun. 20, 2013

(65) Prior Publication Data

US 2014/0379766 A1    Dec. 25, 2014

(51) Int. Cl.
*G06F 17/00* (2006.01)
*G06F 3/06* (2006.01)

(52) U.S. Cl.
CPC .................................. *G06F 3/06* (2013.01)

(58) Field of Classification Search
CPC ......... G06F 19/12; G06F 19/18; G06F 19/28; G06F 3/06
See application file for complete search history.

(56) References Cited

U.S. PATENT DOCUMENTS

| 8,250,327 B2 | 8/2012 | Fujii et al. |
| 2012/0198152 A1 | 8/2012 | Terry et al. |
| 2013/0036266 A1* | 2/2013 | Naganuma ............ G06F 3/061 711/114 |

* cited by examiner

*Primary Examiner* — Truong Vo
(74) *Attorney, Agent, or Firm* — Kunzler Law Group

(57) ABSTRACT

For a distributed high performance pool, the distributed high performance pool is provided with a fast rank. A management module promotes an extent from a storage pool to the distributed high performance pool in response to the extent satisfying promotion criteria. The distributed high performance pool and the storage pool are logically and physically distinct.

17 Claims, 13 Drawing Sheets

110

SSD Rank
120

Enterprise HDD Rank
125

Nearline HDD Rank
130

 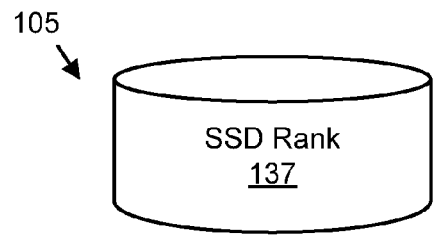
FIG. 3A  FIG. 3B
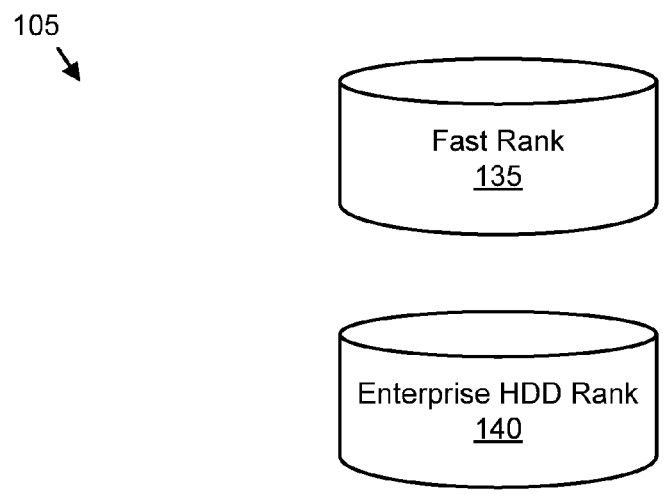
FIG. 3C

DISTRIBUTED HIGH PERFORMANCE POOL

BACKGROUND

1. Field

The subject matter disclosed herein relates to storage pools and more particularly relates to distributed high performance pools.

2. Description of the Related Art

Data may be organized in storage pools with hierarchies of storage devices. Frequently accessed data may be stored in low-latency storage devices that are also more costly while infrequently accessed data may be stored in high-latency, low-cost storage devices.

BRIEF SUMMARY

An apparatus for a distributed high performance pool is disclosed. The apparatus includes the distributed high performance pool and a management module. The distributed high performance pool includes a fast rank. The management module promotes an extent from a storage pool to the distributed high performance pool in response to the extent satisfying promotion criteria. The distributed high performance pool and the storage pool are logically and physically distinct. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 3A-C are schematic diagrams illustrating embodiments of a distributed high performance pool (DHPP);

DETAILED DESCRIPTION

Figure 1:
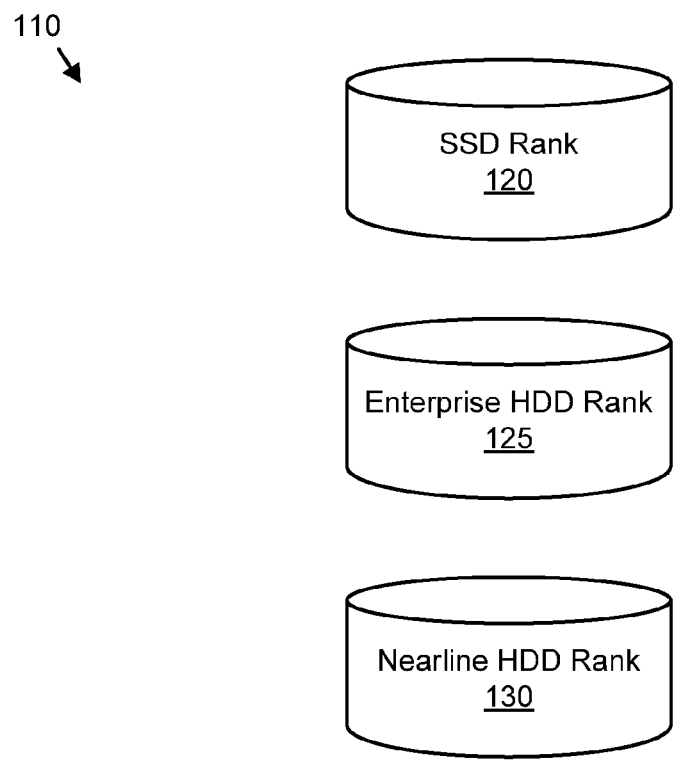
FIG. 1 is a schematic diagram illustrating one embodiment of a storage pool.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic diagram illustrating one embodiment of a storage pool 110. The storage pool 110 includes a hierarchy of ranks. A rank may comprise one or more storage devices. The storage devices may be hard disk drives (HDD), solid-state devices (SSD) such as semiconductor storage devices, micromechanical storage devices, optical storage devices, holographic storage devices, and the like. In the depicted embodiment, the ranks include a SSD rank 120, and enterprise HDD rank 125, and in nearline HDD rank 130. One of skill in the art will recognize that the embodiments may be practiced with any number of ranks.

The SSD rank 120 may include semiconductor storage devices that store data. The SSD rank 120 may have a very low latency. The nearline rank HDD 130 may store data that is infrequently accessed. As a result, the nearline rank HDD 130 may employ high-latency storage devices. Data may be stored on the nearline rank HDD 130 at a low cost. For example, the nearline rank HDD 130 may store archival data.

If data stored in the nearline rank HDD 130 is occasionally accessed, that data may be promoted to the enterprise HDD rank 125. The enterprise HDD rank 125 may have a moderate latency. Data that is seldom accessed from the enterprise HDD rank 125 may be demoted to the nearline rank HDD 130. In addition, data that is frequently accessed from the enterprise HDD rank 125 may be promoted to the SSD rank 120.

Unfortunately, enough frequently accessed data, also referred to as hot data, may be promoted to the SSD rank 120 to exceed the bandwidth capabilities of the SSD rank 120. As a result, the latency of accesses to the SSD rank 120 may fall below target service levels. In the past, some hot data has been warm demoted to the enterprise HDD rank 125. As used herein, warm demotion refers to migrating data to lower ranks of the storage pool hierarchy, particularly when the frequency of accesses to the data does not warrant such a demotion.

While warm demotions of the hot data will improve the response times and latency of the SSD rank 120, the latency of accesses to the warm demoted hot data is still adversely impacted. The embodiments described herein provide a distributed high performance pool (DHPP) to which data can be promoted from the storage pool 110 to increase the performance and reduce the latency of the storage pool 110 without adversely impacting the latency of the migrated data as will be described hereafter.

Figure 2:
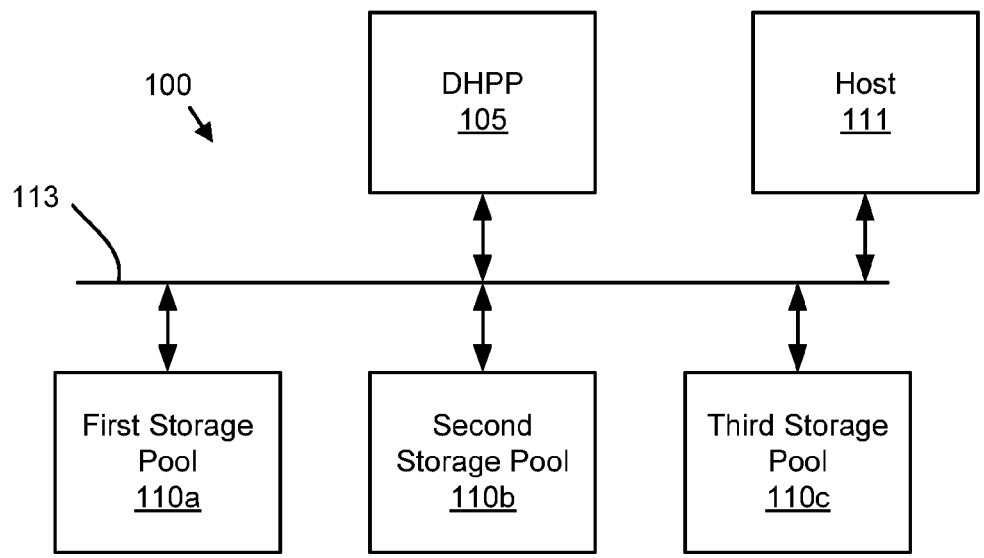
FIG. 2 is a schematic block diagram illustrating one embodiment of a storage system.

FIG. 2 is a schematic block diagram illustrating one embodiment of a storage system 100. The system 100 includes one or more storage pools 110. The storage pools 110 are in communication over a network 113. In one embodiment, each storage pool 110 may be assigned to a customer. The customer may contract for the use of the storage pool 110 from a data center. Alternatively, each storage pool 110 may be assigned to an application such as a transaction database.

The DHPP 105 may also be in communication with the network 113. The DHPP 105 may not be assigned to a customer and/or application. In one embodiment, the DHPP 105 is made available to the storage pools 110 as part of a service. A host 111 may manage the network 113, the storage pools 110, and the DHPP 105. In one embodiment, the host 111 may establish logical links to ranks and extents of the storage pools 110 and/or to the DHPP 105.

FIGS. 3A-C are schematic diagrams illustrating embodiments of the DHPP 105. FIG. 3A depicts the DHPP 105 comprising one or more fast ranks 135. In one embodiment, fastest available storage devices are employed in the fast rank 135. The DHPP 105 may include only fast ranks 135.

The fast rank 135 may be a SSD rank 137 as depicted in FIG. 3B. In a certain embodiment, the DHPP 105 also includes one or more enterprise HDD ranks 140 as illustrated in FIG. 3C.

Figure 4A:
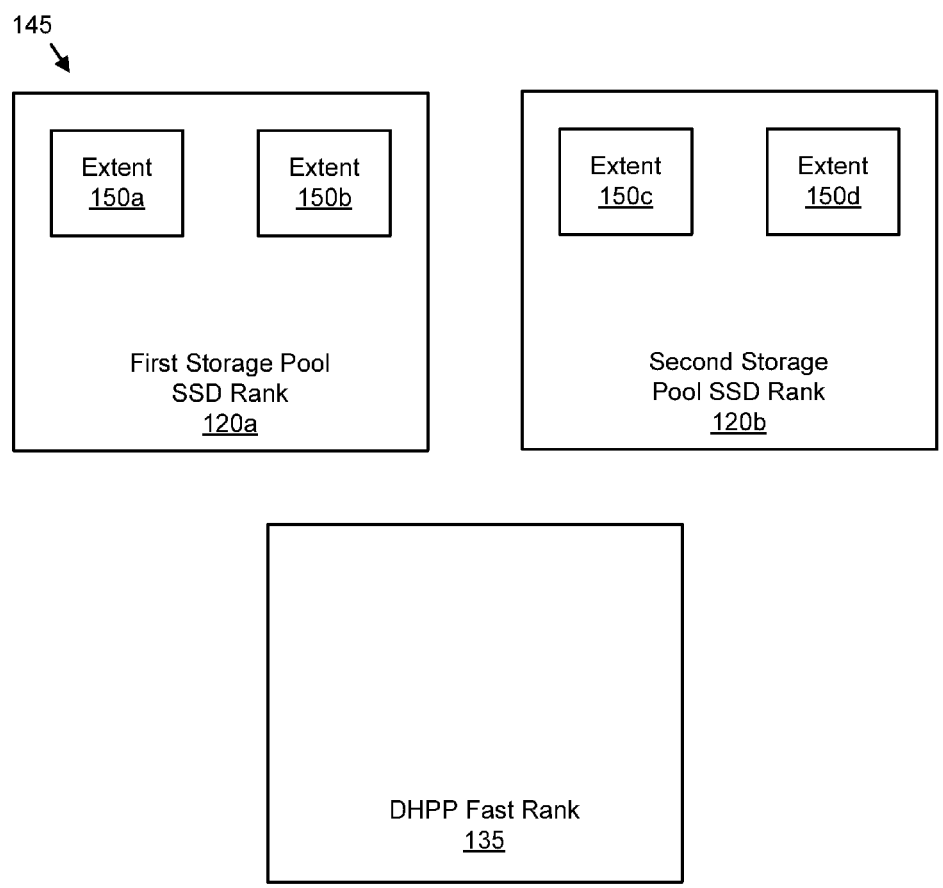
FIGS. 4A-C are schematic block diagrams illustrating embodiments of storage system operation.
Figure 4B:
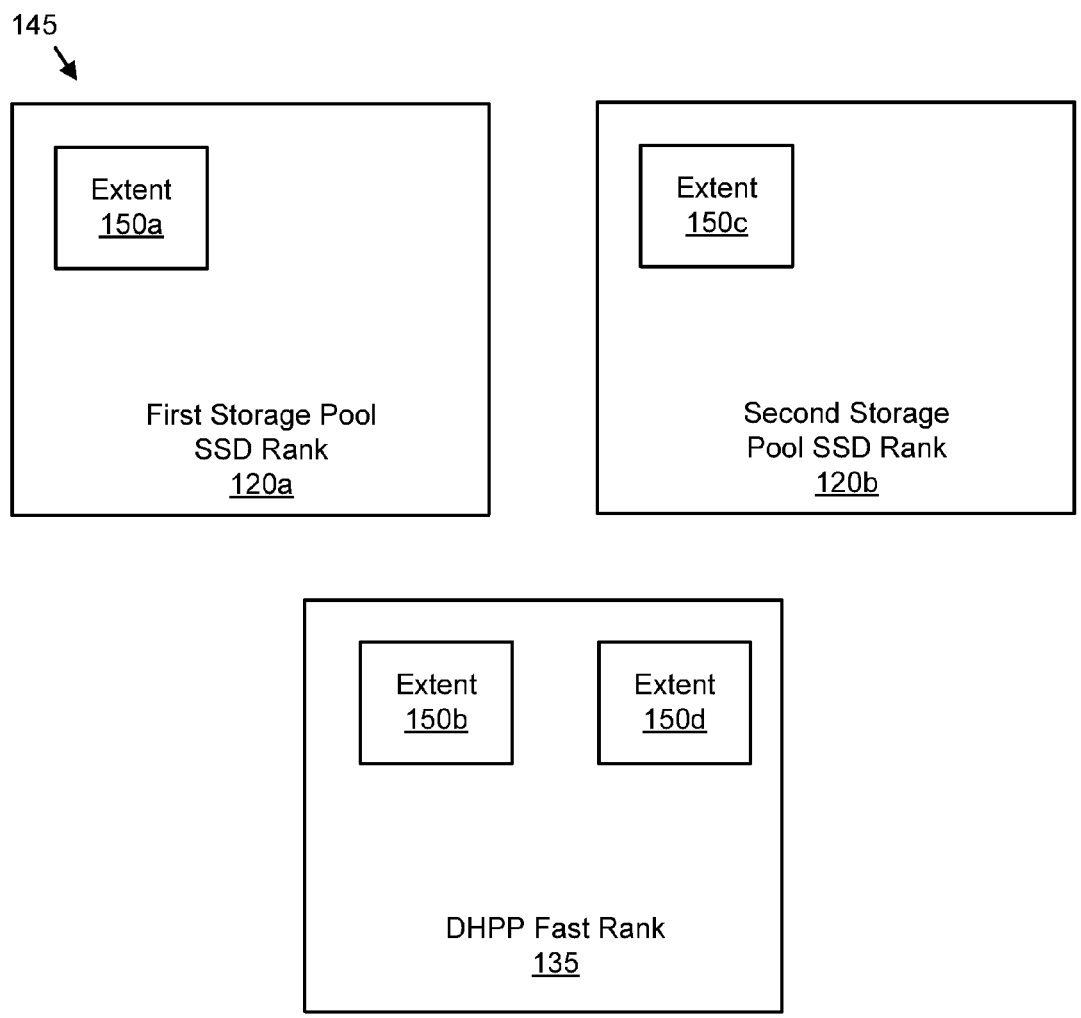
Figure 4C:
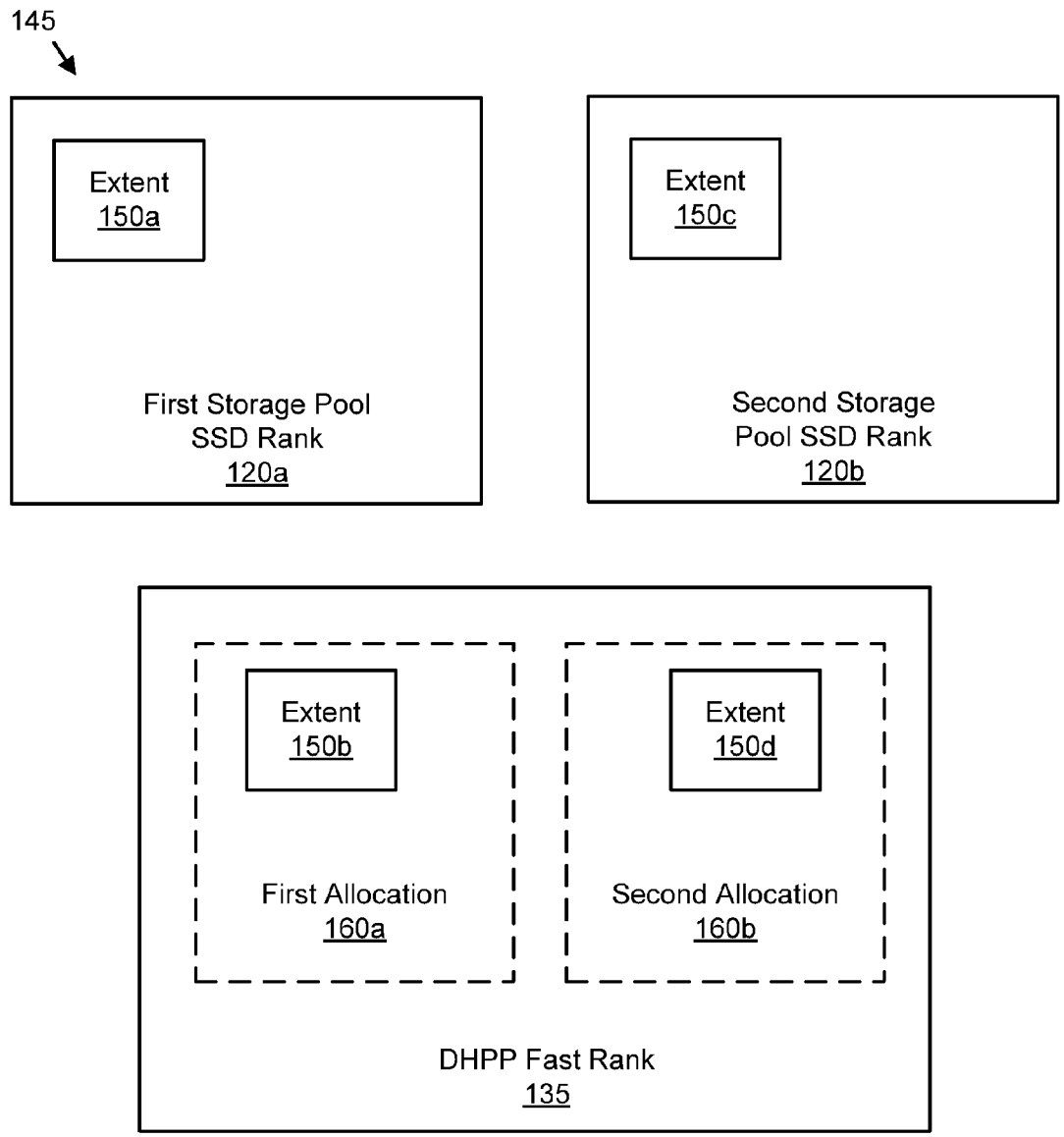

FIGS. 4A-C are schematic block diagrams illustrating embodiments of storage system operation 145. In FIG. 4A, a first storage pool SSD rank 120a and a second storage pool SSD rank 120b are depicted. Each of the SSD ranks 120 stores one or more extents 150. As used herein, an extent 150 may be a portion of a rank. For example, an extent 150 may be a block of a flash memory, a track of a HDD, or the like. The extents 150 stored in the SSD ranks 120 are typically frequently accessed and may be referred to as hot extents 150. Logical links may be established to the extents 150 to access data stored in the extents 150.

The DHPP fast rank 135 is also depicted. Because the DHPP 105 is not associated with a specified customer and/or application, the DHPP 105 and the DHPP fast rank 135 do not store native extents 150.

Accesses to the extents 150 in the SSD ranks 120 may increase the latency and reduce the performance of the SSD ranks 120. In the past, some of the extents 150 would be warm demoted to increase the performance of the SSD rank 120, but at a cost of increasing the latency for the warm demoted extents 150. The embodiments described herein promote and/or migrate some extents 150 from one or more storage pool SSD ranks 120 to the DHPP fast rank 135 to increase the performance and reduce the latency of the storage pool SSD ranks 120 without increasing the latency of the promoted/migrated extents 150 as will be described hereafter.

FIG. 4B depicts the promotion of two extents 150b, 150d from the storage pool SSD ranks 120 to the DHPP fast rank 135 for the storage pool SSD ranks 120 and DHPP fast rank 135 of FIG. 4A. The extents 150b, 150d may be promoted in response to satisfying promotion criteria as will be described hereafter. In one embodiment, the promoted extents 150b, 150d are copied to the DHPP fast rank 135. In addition, the data of the promoted extents 150b, 150d may be deleted from the storage pool SSD ranks 120.

In one embodiment, metadata for the promoted extents 150b, 150d may be retained on the storage pool SSD ranks 120. The metadata for the promoted extents 150b, 150d on the storage pool SSD ranks 120 may be modified to describe the location of the promoted extents 150b, 150d. The modified metadata may be used to access the promoted extents 150b, 150d from the originating storage pools 110.

FIG. 4C depicts the storage pool SSD ranks 120 and the DHPP fast rank 135 of FIG. 4B with the DHPP fast rank 135 having allocations 160 of extents 150 for the first storage pool SSD rank 120a and the second storage pool SSD rank 120b. In one embodiment, the DHPP 105 comprises a plurality of allocations 160 for a plurality of storage pools 110. Each storage pool 110 may have a specified allocation of extents 150 within the DHPP fast rank 135 and/or within the DHPP 105. In one embodiment, a storage pool 110 may not promote more extents 150 to the DHPP 105 than is supported by the allocation 160 for the storage pool 110.

Figure 5A:
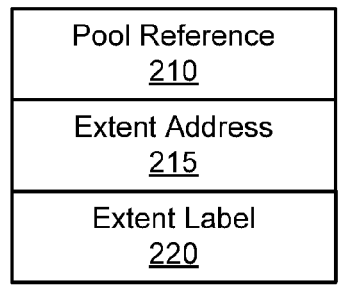
FIGS. 5A-B are schematic block diagrams illustrating embodiments of metadata.
Figure 5B:
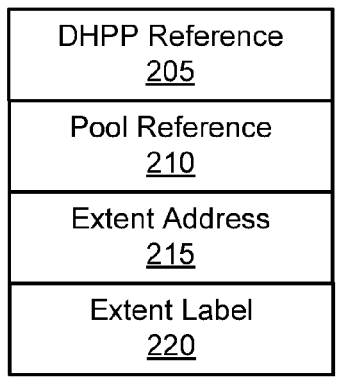
Figure 5B:
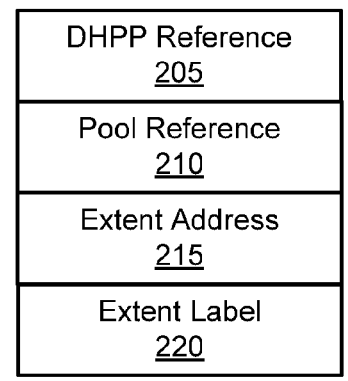

FIGS. 5A-B are schematic block diagrams illustrating embodiments of metadata 200. The metadata 200 may describe a data set stored in one or more extents 150. Alternatively, the metadata 200 may describe one or more extents 150. FIG. 5A depicts pool metadata 200a for one or more extents 150 stored in the storage pool 110. The pool metadata 200a includes a pool reference 210, an extent address 215, and an extent label 220. The pool reference 210 may specify the storage pool 110 originally storing the data set and/or the one or more extents 150. The extent address 215 may include a logical and/or physical address of the one or more extents 150 within the storage pool 110. The extent label 220 may describe the one or more extents 150. The extent label 220 may include a logical name for the one or more extents 150 and/or the data set.

FIG. 5B depicts the pool metadata 200a of FIG. 5A after the one or more extents 150 described by the pool metadata 200a are promoted to one or more DHPP 105. The pool metadata 200a is modified to include a DHPP reference 205. The DHPP reference 205 may specify the DHPP 105 storing the data set of the one or more extents 150 and/or the extents 150. The extent address 215 may be modified to a logical and/or physical address of the one or more extents 150 within the DHPP 105. The extent label 220 of the DHPP metadata 200b may include a logical name for the extents 150 and/or data set in the DHPP 105, in the originating pool 110, or combinations thereof.

DHPP metadata 200b is also created for the promoted extents 150 in the DHPP 105. The DHPP metadata 200b includes the DHPP reference 205. The DHPP metadata 200b also includes the pool reference 210 identifying the originating storage pool 110. The extent address 215 of the DHPP metadata 200b may include a logical and/or physical address of the one or more extents 150 within the DHPP 105. The extent label 220 of the DHPP metadata 200b may include a logical name for the extents 150 and/or data set in the DHPP 105, in the originating pool 110, or combinations thereof.

Figure 6:
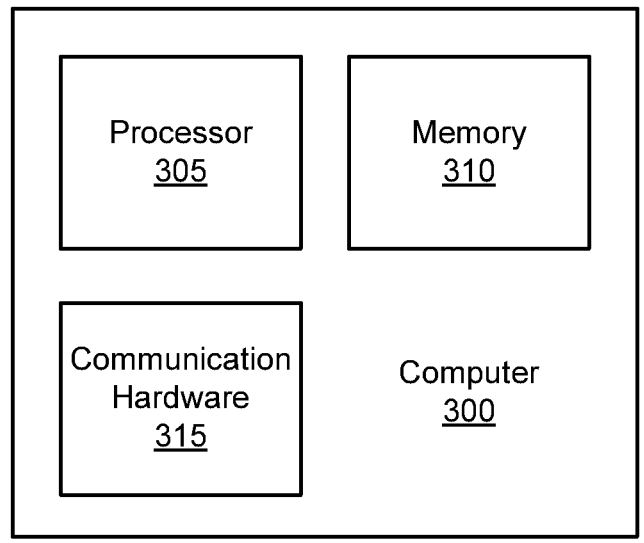
FIG. 6 is a schematic block diagram illustrating one embodiment of a computer.

FIG. 6 is a schematic block diagram illustrating one embodiment of a computer 300. The computer 300 may be embodied in the host 111. Alternatively, the computer 300 may be embodied in one or more of the host 111, the DHPP 105, and the storage pools 110. The computer 300 includes a processor 305, a memory 310, and communication hardware 315. The memory 310 may be a semiconductor storage device, a HDD, an optical storage device, a micromechanical storage device, a holographic storage device, or combinations thereof. The memory 310 may store program code. The processor 305 may execute the program code. The communication hardware 315 may communicate with other devices.

Figure 7:
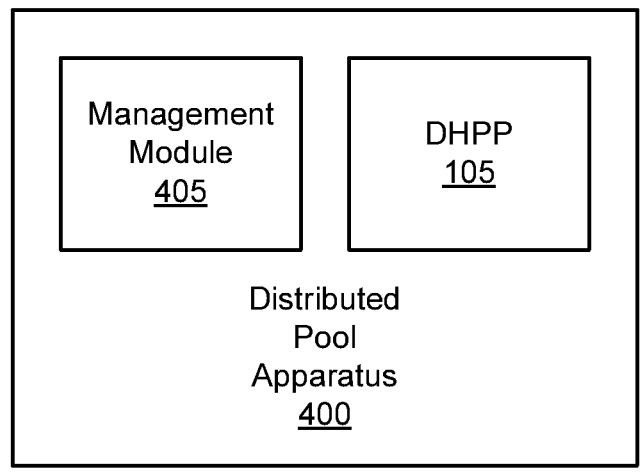
FIG. 7 is a schematic block diagram illustrating one embodiment of a distributed pool apparatus.

FIG. 7 is a schematic block diagram illustrating one embodiment of a distributed pool apparatus 400. The apparatus 400 may be embodied in the computer 300, the DHPP 105, and combinations thereof. The apparatus 400 includes a management module 405 and the DHPP 105. The management module 405 may comprise one or more of hardware and program code. The program code may be stored on one or more computer readable storage media such as the memory 310.

The DHPP 105 may comprise one or more fast ranks 135. The management module may promote an extent 150 from a storage pool 110 to the DHPP 105 in response to the extent 150 satisfying promotion criteria as will be described hereafter.

Figure 8:
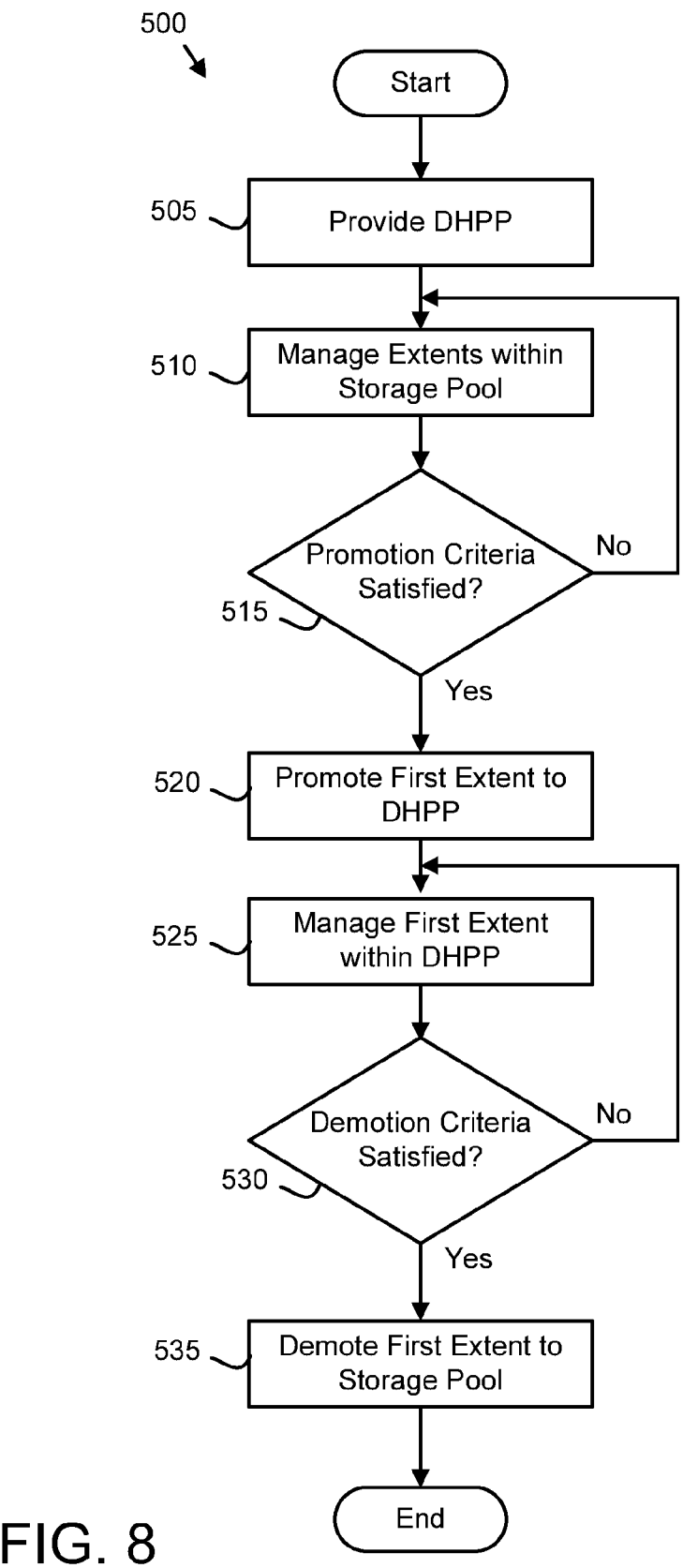
FIG. 8 is a schematic flow chart diagram illustrating one embodiment of a distributed high performance pool method.

FIG. 8 is a schematic flow chart diagram illustrating one embodiment of a distributed high performance pool method 500. In one embodiment, the method 500 is performed by the apparatus 400 and/or the system 100. The method 500 may be performed by the processor 305. Alternatively, the method 500 may be performed by a computer program product comprising a computer readable storage medium such as the memory 310. The computer readable storage medium may have program code embodied therein. The program code may be executed by the processor 305 to perform the operations of the method 500.

The method 500 starts, and in one embodiment the DHPP 105 is provided 505 in the system 100. In addition, storage pools 110 may be provided in the system 100. The management module 405 manages 510 extents 150 within the storage pools 110. For example, the management module 405 may promote and demote extents 150 within each storage pool 110.

The management module 405 may determine 515 if an extent 150 in a first storage pool 110a satisfies promotion criteria. In one embodiment, the promotion criteria are satisfied when a number of logical links to the extent 150 in the first storage pool 110a exceeds a link threshold. For example, the link threshold may be 90 logical links. If the number of logical links to the extent 150 in the first storage pool 110a exceeds 90 logical links, the extent 150 may satisfy the promotion criteria.

In one embodiment, the promotion criteria are satisfied when a number of accesses to the extent 150 in the first storage pool 110a exceeds an access threshold. The access threshold may specify a number of accesses, such as reads and writes, to the extent 150 within an access time interval. For example, the access threshold may be 10,000 accesses within a 10 second access time interval. If the extent 150 on the first storage pool 110a is accessed over 10,000 times during the 10 second access time interval, the promotion criteria may be satisfied.

The promotion criteria may be satisfied when a quantity of data exchanged with the extent 150 in the first storage pool 110a exceeds a data threshold. The data threshold may specify a quantity of data such as one gigabyte (GB). In one embodiment, the data threshold may specify a quantity of data exchanged within a data time interval. For example, the data threshold may be 50 megabytes (MB) per second. Thus the promotion criteria may be satisfied when 60 MB per second of data is exchanged with the extent 150.

If the management module 405 determines 515 that the extent 150 does not satisfy the promotion criteria, the management module 405 continues to manage 510 the extent 150 within the first storage pool 110a. If the extent 150 satisfies the promotion criteria, the management module 405 promotes 520 the extent 150 to the DHPP 105. In one embodiment, the management module 405 migrates the extent 150 from the storage pool 110 to the DHPP 105. The management module 405 may copy the extent 150 to the DHPP 105 and delete the extent 150 from the storage pool 110. Alternatively, the management module 405 may copy the extent 150 to the DHPP 105 while allowing an instance of the extent 150 to remain on the storage pool 110.

The management module 405 may further promote 520 the extent 150 by modifying the pool metadata 200a for the extent 150 on the storage pool 110 to specify the DHPP 105 and describe the location of the extent 150 in the DHPP 105. In addition, the management module 405 may create DHPP metadata 200b for the extent 150 in the DHPP 105.

The management module 405 may manage 525 the promoted extent 150 within the DHPP 105. The extent 150 may be accessed from the DHPP 105. In one embodiment, an access to the originating storage pool 110 of the extent 150 is redirected to the DHPP 105 using the pool metadata 200a. Alternatively, the host 111 may direct an access for the extent 150 to the DHPP 105.

In one embodiment, the management module 405 determines 530 if the extent 150 satisfies 530 demotion criteria. The demotion criteria may be satisfied in response to a number of logical links to the extent 150 in the DHPP 105 being less than a demotion access threshold. The demotion access threshold may specify a number of logical links to the extent 150 in the DHPP 105. Alternatively, the demotion criteria may be satisfied in response to a number of accesses to the extent 150 in the DHPP 105 being less than a demotion access threshold. The demotion access threshold may specify a number of accesses to the extent 150 in the DHPP 105 during the access time interval. In one embodiment, the demotion criteria may be satisfied in response to a quantity of data exchanged with the extent 150 in the DHPP 105 being less than a demotion data threshold. The demotion data threshold may specify a quantity of data exchanged with the extent 150 in the DHPP 105 within the data time interval.

If the management module 405 determines 530 that the extent 150 does not satisfy the demotion criteria, the management module 405 continues to manage 525 the extent 150 within the DHPP 105. If the extent 150 satisfies the demotion criteria, the management module 405 may demote 535 the extent 150 and the method 500 ends. In one embodiment, the extent 150 is demoted 535 from the DHPP 105 to the originating storage pool 110. The management module 405 may copy the extent 150 from the DHPP 105 to the originating storage pool 110. In addition, the management module 405 may delete the extent 150 from the DHPP 105. Alternatively, the extent 150 is demoted 535 from the fast rank 135 to the enterprise HDD rank 140 of the DHPP 105.

Figure 9:
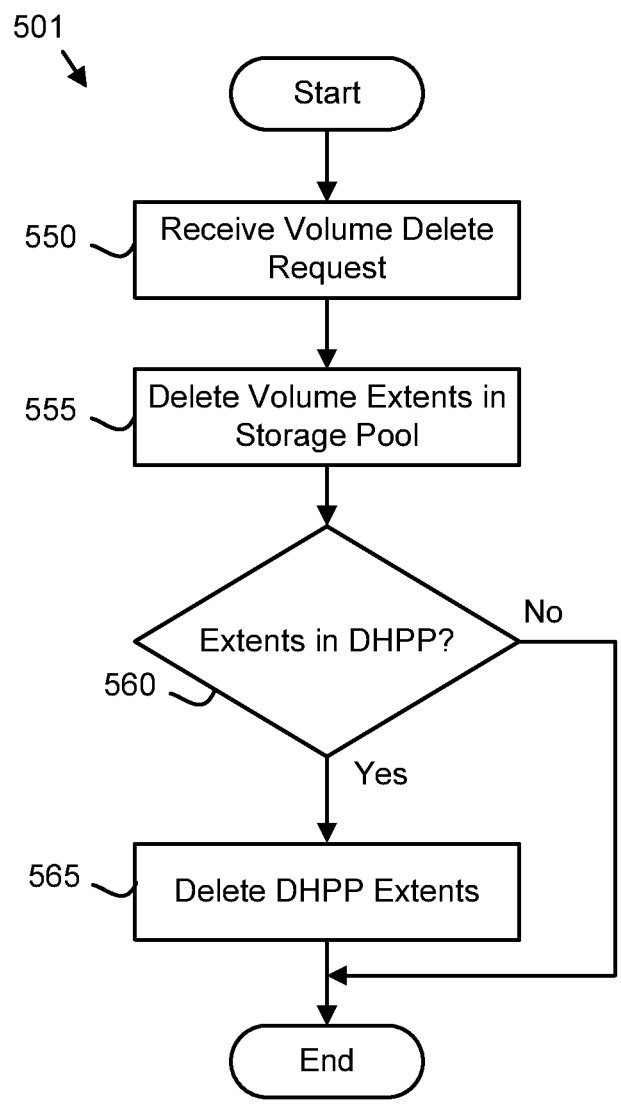
FIG. 9 is a schematic flow chart diagram illustrating one embodiment of a volume delete method.

FIG. 9 is a schematic flow chart diagram illustrating one embodiment of a volume delete method 501. In one embodiment, the method 501 is performed by the apparatus 400 and/or the system 100. The method 501 may be performed by the processor 305. Alternatively, the method 501 may be performed by a computer program product comprising a computer readable storage medium such as the memory 310. The computer readable storage medium may have program code embodied therein. The program code may be executed by the processor 305 to perform the operations of the method 501.

The method 501 starts, and in one embodiment, the management module 405 receives 550 of volume delete request. The volume delete request may be for a volume comprising one or more extents on a storage pool 110. The volume may be a logical volume. In one embodiment, the volume delete request is received from the host 111.

The management module 405 may delete 555 the volume on the storage pool 110. In addition, the management module 405 may determine 560 if volume extents 150 for the volume are on the DHPP 105. In one embodiment, the management module 405 queries the pool metadata 200a to determine 560 if the volume extents 150 for the volume were on the DHPP 105. For example, if the DHPP reference 205 of the pool metadata 220a specifies the DHPP 105, the management module 405 may determine 560 that volume extents 150 for the volume were on the DHPP 105.

If the volume extents 150 for the volume are not on the DHPP 105, the method 501 ends. If the volume extents 150 for the volume are on the DHPP 105, the management module 405 may delete 565 the volume extents 150 for the volume on the DHPP 105 and the method 501 ends.

Figure 10:
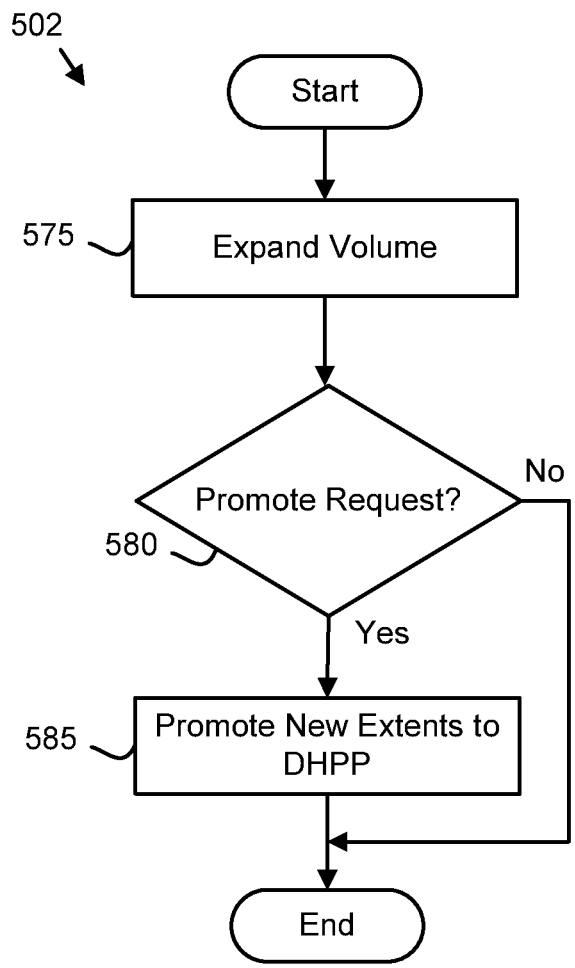
FIG. 10 is a schematic flow chart diagram illustrating one embodiment of a volume expansion method.

FIG. 10 is a schematic flow chart diagram illustrating one embodiment of a volume expansion method 502. In one embodiment, the method 502 is performed by the apparatus 400 and/or the system 100. The method 502 may be performed by the processor 305. Alternatively, the method 502 may be performed by the computer program product comprising a computer readable storage medium such as the memory 310. The computer readable storage medium may have program code embodied therein. The program code may be executed by the processor 305 to perform the operations of the method 502.

The method 502 starts, and in one embodiment the management module 405 expands 575 a volume on a storage pool 110. The volume may be a logical volume. In one embodiment, the management module 405 expands the volume by adding new extents 150 from the storage pool 110 to the volume.

The management module 405 further determines 580 if a promote request to promote the new extents 150 of the volume to the DHPP 105 is received. If the promote request is not received, the method 502 ends. If the management module 405 determines 580 that the promote request is received, the management module 405 promotes the new extents 150 from the storage pool 110 to the DHPP 105 and the method 502 ends. The management module 405 may promote a new extents 150 by copying the new extents 150 to the DHPP 105. The management module 405 may also modify the pool metadata 200a for the new extents 150 and create DHPP metadata 200b for the copies of the new extents 150 in the DHPP 105.

Figure 11:
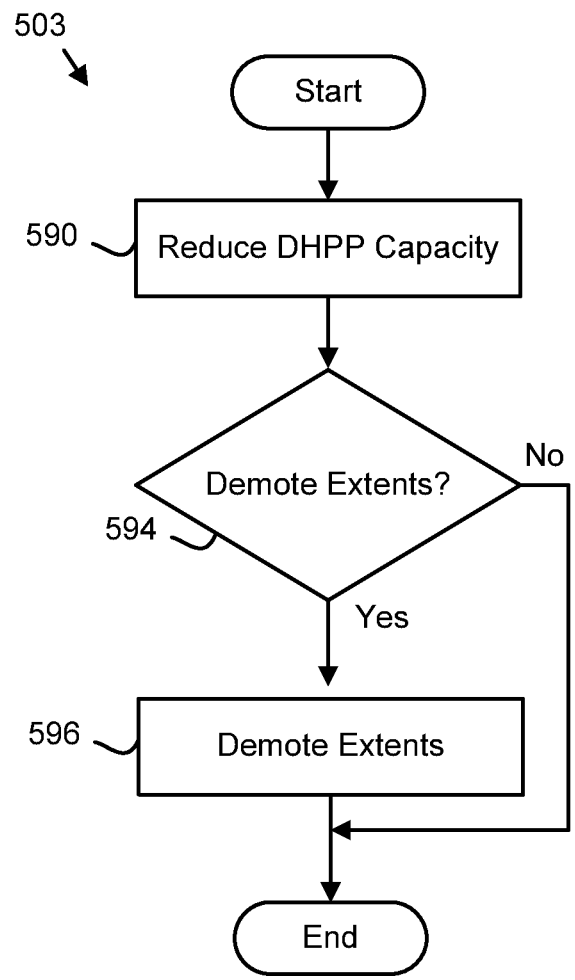
FIG. 11 is a schematic flow chart diagram illustrating one embodiment of a DHPP capacity reduction method.

FIG. 11 is a schematic flow chart diagram illustrating one embodiment of a DHPP capacity reduction method 503. In one embodiment, the method 503 is performed by the apparatus 400 and/or the system 100. The method 503 may be performed by the processor 305. Alternatively, the method 503 may be performed by the computer program product comprising a computer readable storage medium such as the memory 310. The computer readable storage medium may have program code embodied therein. The program code may be executed by the processor 305 to perform the operations of the method 503.

The method 503 starts, and in one embodiment, the management module 405 reduces 590 the capacity of the DHPP 105. The capacity of the DHPP 105 may be reduced by reducing the number of extents 150 in the DHPP 105. In one embodiment, one or more ranks are removed from the DHPP 105. In a certain embodiment, the capacity of the DHPP 105 is reduced in response to an administrator request.

The management module 405 may determine 594 whether to demote extents 150 from the DHPP 105 to an originating storage pool 110 in response to reducing the capacity of the DHPP 105. In one embodiment, the management module 405 determines 594 to demote the extents 150 from the DHPP 105 to the originating storage pool 110 in response to the administrator request. Alternatively, the management module 405 may determine 594 to demote the extents 150 so that the DHPP 105 stores a number of extents 150 less than a target threshold. The target threshold may be a total number of extents 150 stored by the DHPP 105. Alternatively, the target threshold may be a number of extent stored for a customer, stored for an application, and the like.

If the extents 150 are not to be demoted, the method 503 ends. If the management module 405 determines 594 to demote the extents 150, the management module may demote 596 the extents 150 and the method 503 ends. In one embodiment, the extents 150 are demoted 596 by copying the extents 150 from the DHPP 105 to the originating storage pool 110. In addition, the extents 150 may be deleted from the DHPP 105. In one embodiment, the pool metadata 200a is updated to reflect that the extents 150 reside in the originating storage pool 110. The DHPP metadata 200b may also be updated to indicate that the extents 150 are stored in the storage pool 110. Alternatively, the DHPP metadata 200b may be deleted.

Figure 12:
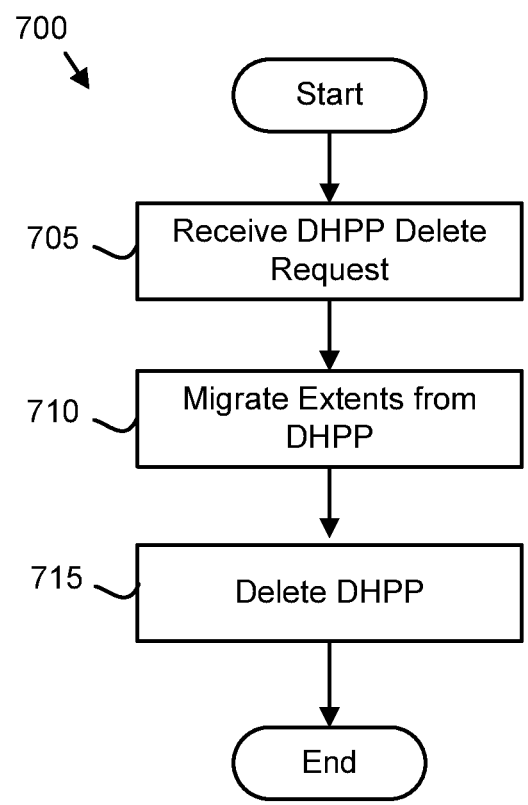
FIG. 12 is a schematic flow chart diagram illustrating one embodiment of a DHPP delete method.

FIG. 12 is a schematic flow chart diagram illustrating one embodiment of a DHPP delete method 700. In one embodiment, the method 700 is performed by the apparatus 400 and/or the system 100. The method 700 may be performed by the processor 305. Alternatively, the method 700 may be performed by the computer program product comprising a computer readable storage medium such as the memory 310. The computer readable storage medium may have program code embodied therein. The program code may be executed by the processor 305 to perform the operations of the method 700.

The method 700 starts, and in one embodiment, the management module 405 receives 705 a DHPP delete request. The DHPP delete request may be communicated to the host 111 by an administrator.

The management module 405 may migrate 710 all extents 150 stored on the DHPP 105 to the originating storage pools 110 for the extents 150. For example, if the first extent 150a is from a first storage pool 110a, the management module 405 may migrate 710 the first extent 150a to the originating first storage pool 110a. The management module 405 may further update the pool metadata 200a for the migrated extents 150 to indicate that the migrated extents 150 reside in the originating storage pools 110.

The management module 405 may further delete 715 the DHPP 105 and the method 700 ends. In one embodiment, the DHPP 105 is deleted 715 by deallocating all extents 150 in the DHPP 105. The DHPP 105 may also be deleted 715 by deallocating all ranks such as the fast rank 135 in the DHPP 105. The management module 405 may also update the DHPP metadata 200b to indicate that the migrated extents 150 reside in the originating storage pools 110. Alternatively, the management module 405 may delete the DHPP metadata 200b.

Figure 13:
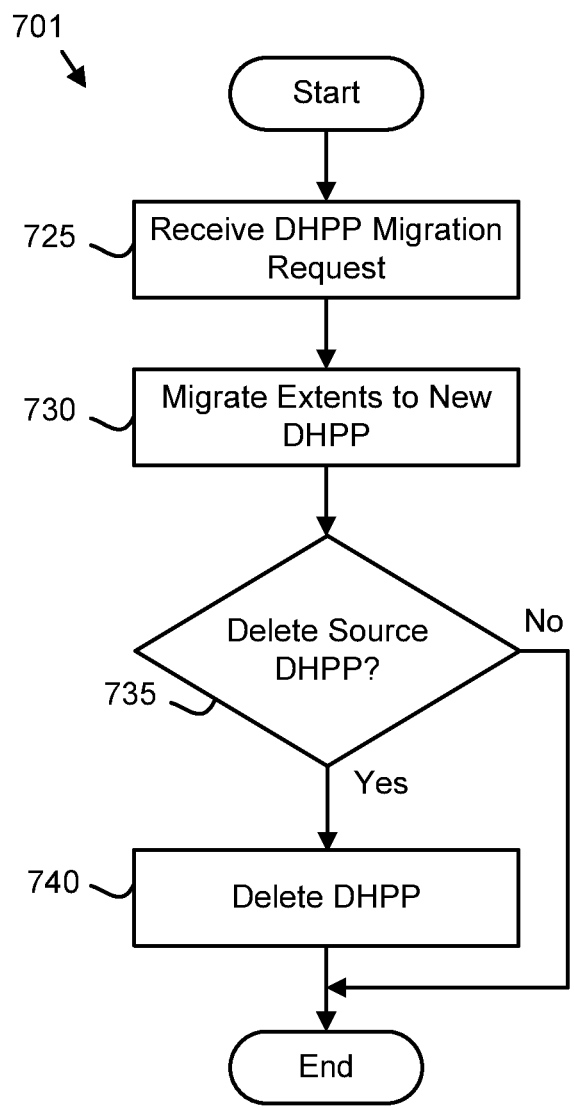
FIG. 13 is a schematic flow chart diagram illustrating one embodiment of a DHPP migration method.

FIG. 13 is a schematic flow chart diagram illustrating one embodiment of a DHPP migration method 701. In one embodiment, the method 701 is performed by the apparatus 400 and/or the system 100. The method 701 may be performed by the processor 305. Alternatively, the method 701 may be performed by the computer program product comprising a computer readable storage medium such as the memory 310. The computer readable storage medium may have program code embodied therein. The program code may be executed by the processor 305 to perform the operations of the method 701.

The method 701 starts, and in one embodiment, the management module 405 received 725 a DHPP migration request. An administrator may communicate the DHPP migration request through the host 111. In one embodiment, the DHPP migration request specifies a source DHPP 105 and a target DHPP 105. In addition, the DHPP migration request may specify whether to delete the source DHPP 105.

The management module 405 may migrate 730 extents 150 from the source DHPP 105 to the target DHPP 105. In one embodiment, the extents 150 are migrated 730 by copying the extents 150 from the source DHPP 105 to the target DHPP 105. In addition, the extents 150 may be deleted from the source DHPP 105.

The management module 405 may determine 735 whether to delete the source DHPP 105. The management module 405 may determine 735 whether to delete the source DHPP 105 from the DHPP migration request. Alternatively, the management module 405 may determine 735 whether to delete the source DHPP 105 from a retention parameter.

If the management module 405 determines 735 not to delete the source DHPP 105, the method 701 ends. If the management module 405 determine s735 to delete the source DHPP 105, the management module 405 may delete 740 the source DHPP 105 and the method 701 ends. In one embodiment, each extent 150 in the source DHPP 105 is erased. In addition, each extent 150 may be deallocated. The ranks of the source DHPP 105 may also be deallocated.

By promoting extents 150 from storage pools 110 to the DHPP 105, the embodiments support maintaining the performance of the storage pools 110 without adding additional storage devices and ranks to storage pools 110. As a result, the storage pools 110 may be managed more cost-effectively while providing required performance and latency when needed.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a distributed high performance pool (DHPP), wherein the DHPP is a solid-state device (SSD) rank;
a processor; and
a memory storing code executable by the processor to perform;
promoting a first extent from a first storage pool to an allocation in the DHPP for the first storage pool in response to the first extent satisfying promotion criteria by modifying an extent address in pool metadata for the first extent to a physical address of the first extent in the DHPP and appending a DHPP reference to the pool metadata, wherein the first storage pool is a SSD rank and is assigned to a first customer, the pool metadata describes the first extent, and the promotion criteria are satisfied in response to a number of logical links to the first extent in the first storage pool exceeding a link threshold.

2. The apparatus of claim 1, wherein the pool metadata comprises a pool reference locating the first extent in the first storage pool.

3. The apparatus of claim 1, wherein the promotion criteria are further satisfied in response to a number of accesses to the first extent in the first storage pool exceeding an access threshold.

4. The apparatus of claim 1, wherein the promotion criteria are further satisfied in response to a quantity of data exchanged with the first extent in the first storage pool exceeding a data threshold.

5. The apparatus of claim 1, the processor further demoting the first extent to one of the first storage pool and an enterprise hard disk drive rank in the DHPP in response to the first extent satisfying demotion criteria.

6. The apparatus of claim 1, the processor further:
receiving a volume delete request for a first volume on the first storage pool;
deleting the first volume on the first storage pool; and
deleting first volume extents on the DHPP in response to determining the first volume extents reside on the DHPP.

7. The apparatus of claim 1, the processor further:
expanding a first volume on the first storage pool;
receiving a promote request to promote new extents of the first volume to the DHPP; and
promoting the new extents to the DHPP.

8. The apparatus of claim 1, the processor further demoting first volume extents from the DHPP in response to reducing DHPP capacity.

9. The apparatus of claim 1, wherein the first extent is organized in a first allocation on the DHPP assigned the first storage pool, the DHPP comprising a plurality of allocations for a plurality of storage pools, and each storage pool is assigned to a customer.

10. A method for a distributed high performance pool (DHPP) comprising:
providing the DHPP comprising a fast rank, wherein the DHPP is a solid-state device (SSD) rank and the DHPP and a first storage pool are logically and physically distinct; and
promoting, using a processor, a first extent from the first storage pool to an allocation in the DHPP for the first storage pool in response to the first extent satisfying promotion criteria by modifying an extent address in pool metadata for the first extent to a physical address of the first extent in the DHPP and appending a DHPP reference to the pool metadata, wherein the first storage pool is a SSD rank and is assigned to a first customer, the pool metadata describes the first extent, and the promotion criteria are satisfied in response to a number of logical links to the first extent in the first storage, pool exceeding a link threshold.

11. The method of claim 10, wherein the pool metadata comprises a pool reference locating the first extent in the first storage pool.

12. The method of claim 10, the method further comprising:
receiving a DHPP delete request;
migrating extents from the DHPP to the first storage pool; and
deleting the DHPP.

13. The method of claim 10, the method further comprising:

receiving a DHPP migration request;
migrating extents from a source DHPP pool to a target DHPP; and
deleting the source DHPP.

14. A computer program product for a distributed high performance pool (DHPP), the computer program product comprising a computer readable storage medium having program code embodied therein, the program code readable/executable by a processor to:
   determining if a first extent from a first storage pool satisfies promotion criteria, wherein the DHPP and the first storage pool are logically and physically distinct and the DHPP is a solid-state device (SSD) rank; and
   promoting the first extent to an allocation in the DHPP for the first storage pool in response to the first extent satisfying the promotion criteria by modifying an extent address in pool metadata for the first extent to a physical address of the first extent in the DHPP and appending a DHPP reference to the pool metadata, wherein the first storage pool is a SSD rank and is assigned to a first customer, the pool metadata describes the first extent, and the promotion criteria are satisfied in response to a number of logical links to the first extent in the first storage pool exceeding a link threshold.

15. The computer program product of claim 14, wherein the pool metadata comprises a pool reference locating the first extent in the first storage pool.

16. The computer program product of claim 14, wherein the promotion criteria are further satisfied in response to a number of accesses to the first extent in the first storage pool exceeding an access threshold.

17. The computer program product of claim 14, wherein the promotion criteria are further satisfied in response to a quantity of data exchanged with the first extent in the first storage pool exceeding a data threshold.

* * * * *